US008536267B2

(12) United States Patent
Chun et al.

(10) Patent No.: US 8,536,267 B2
(45) Date of Patent: Sep. 17, 2013

(54) SURFACE MODIFICATION OF POLYMER PARTICLES

(75) Inventors: Doris Pik-Yiu Chun, Sunnyvale, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 44 days.

(21) Appl. No.: 13/259,430

(22) PCT Filed: Sep. 11, 2009

(86) PCT No.: PCT/US2009/056588
§ 371 (c)(1),
(2), (4) Date: Sep. 23, 2011

(87) PCT Pub. No.: WO2011/031265
PCT Pub. Date: Mar. 17, 2011

(65) Prior Publication Data
US 2012/0157608 A1  Jun. 21, 2012

(51) Int. Cl.
*C08L 31/00* (2006.01)
*C08F 118/02* (2006.01)
*C09D 151/00* (2006.01)
*C08K 9/10* (2006.01)

(52) U.S. Cl.
USPC ............ 524/556; 526/319; 523/201; 523/206

(58) Field of Classification Search
USPC .................. 524/556; 523/201, 206; 526/319
See application file for complete search history.

(56) References Cited

U.S. PATENT DOCUMENTS

| | | | |
|---|---|---|---|
| 6,083,315 A | 7/2000 | Nakamura et al. | |
| 6,858,301 B2 | 2/2005 | Ganapathiappan | |
| 6,881,761 B2 | 4/2005 | Kotsuka et al. | |
| 7,132,464 B2 * | 11/2006 | Nakamura et al. | 523/160 |
| 7,371,273 B2 | 5/2008 | Vincent et al. | |
| 7,384,990 B2 | 6/2008 | Zhou | |
| 7,465,765 B2 | 12/2008 | Ganapathiappan et al. | |
| 7,544,736 B2 | 6/2009 | Zhou et al. | |
| 7,553,886 B2 | 6/2009 | Ganapathiappan | |
| 7,662,878 B2 * | 2/2010 | Idemura et al. | 524/357 |
| 2003/0158291 A1 | 8/2003 | Nakamura et al. | |
| 2004/0116553 A1 * | 6/2004 | Nakamura et al. | 523/160 |
| 2009/0018245 A1 | 1/2009 | Idemura et al. | |
| 2009/0169748 A1 | 7/2009 | House et al. | |

\* cited by examiner

*Primary Examiner* — Michael M Bernshteyn

(57) ABSTRACT

Methods of surface modification of polymer particle are useful in the development of marking fluids. The surface modification includes saponifying one or more acrylic ester groups on a surface of the polymer particle.

15 Claims, 3 Drawing Sheets

SURFACE MODIFICATION OF POLYMER PARTICLES

BACKGROUND

In a typical inkjet recording or printing system, droplets of marking fluid, sometimes referred to as ink, are ejected from a nozzle, i.e., jetted, towards a recording medium to produce an image on the medium. The droplets generally include a colorant, such as one or more dyes or pigments, for marking the medium, and some aqueous or solvent-based carrier vehicle to facilitate controlled ejection of the marking fluid. While aqueous carrier vehicles are more environmentally friendly than solvent-based carrier vehicles, their colorants are usually more prone to smearing or durability concerns.

To improve the durability of aqueous marking fluids, polymer particles are often added to the marking fluid formulations. When printed as part of an inkjet ink, a polymer component of the ink can form a film on a media surface, entrapping and protecting the colorant within the hydrophobic print film.

For the reasons stated above, and for other reasons that will become apparent to those skilled in the art upon reading and understanding the present specification, alternative polymer particles for marking fluid formulations and other applications, as well as their methods of manufacture, are desirable.

DETAILED DESCRIPTION

Figure 1:
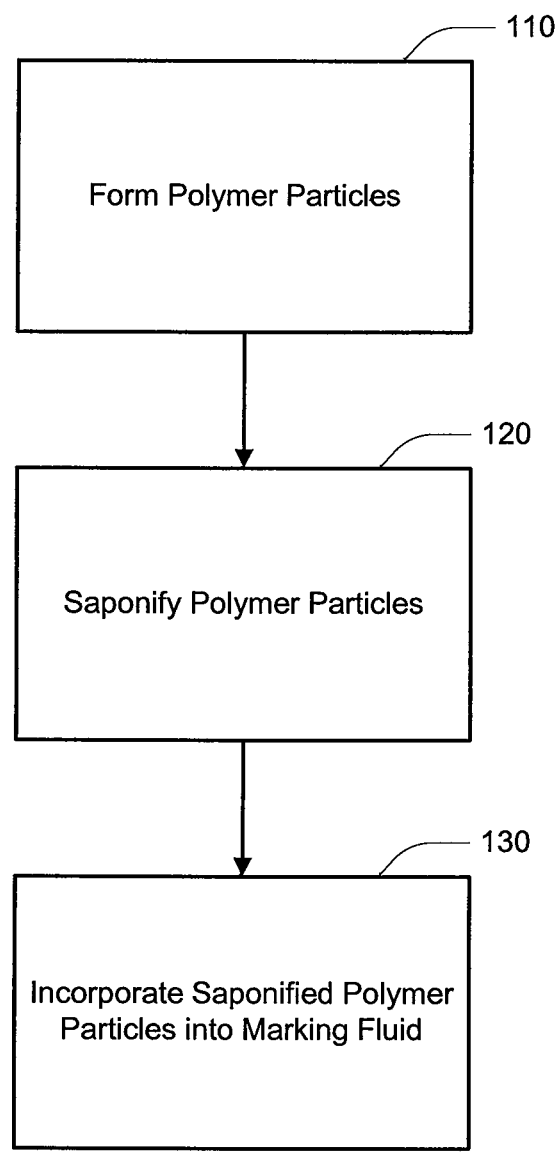
FIG. 1 is a flowchart of a method of forming polymer particles for use in marking fluids in accordance with an embodiment of the disclosure.

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, chemical or mechanical changes may be made without departing from the scope of the present disclosure. The following detailed description is, therefore, not to be taken in a limiting sense, and the scope of the present disclosure is defined by the appended claims and equivalents thereof.

In order for the solid contents in a liquid marking fluid to jet and remain dispersed, a measurable balance of certain polar functional groups on the solid surfaces are typically required. Current water-based pigment ink technology utilizes traditional latex synthesis for polymer preparation, which offers many advantages to improve print quality. However, such synthetic methods are typically limiting the amount of polar monomers that can be incorporated for desired performance and product quality characteristics. Many acrylic and methacrylic monomers may be utilized to make functional latexes that could facilitate superior product quality, but such compositions are known to jet poorly due to an insufficient amount of polar functional groups.

The various embodiments modify the surface of the polymer particles to increase their surface polar group density to thereby facilitate an increase in the electrostatic repulsion of the otherwise unstable and non-jetting lattices to achieve thermal jetting. In particular, various embodiments utilize saponification to hydrolyze lattices containing embedded or pendent esters. Saponification is the hydrolysis of an ester under basic conditions to form an alcohol and the salt of a carboxylic acid. Embodiments described herein are applicable to any short-chain linear ester-containing latex formulations where beta-elimination is substantially absent, i.e., where the beta position is substituted, or the gamma or beta positions are protected by sterically hindered groups. Polymer particles containing a wide range of such esters, e.g., polymers containing 2-80% of linear short-chain esters, find use in the various embodiments. For some embodiments, the polymer particles contain an encapsulated colorant.

The various embodiments further include marking fluids containing polymer particles which have been surface modified in accordance with embodiments of the disclosure in an aqueous liquid vehicle. The marking fluid further contains one or more colorants, e.g., pigments or dyes, to impart color to the marking fluid. The marking fluid may further contain one or more surfactants, co-solvents, biocides and other components that affect shelf-life, performance or other characteristics of the marking fluid.

A typical reaction setup may involves refluxing preformed polymer in the presence of a nucleophilic base, such as sodium hydroxide (NaOH) or potassium hydroxide (KOH), for 0.5 to 10 hours. The degree of hydrolysis will be dependent on the amount of base added as well as the length of reaction time. The pH of the resulting solution should generally be controlled to greater than or equal to 8 to facilitate dispersion stability. The final pH of the solution can be adjusted with additional base to obtain a particular pH for use in the marking fluid. The additional base may include a different base than that used for saponification. While a metallic alkali, such as NaOH or KOH, might be used for saponification, for example, a different base, such as ammonium hydroxide ($NH_4OH$), could be used to adjust the final pH.

Polymers for use with various embodiments contain 2% or more by weight of an acrylic ester in the formulation. Monomers that provide spatial conformational flexibility generally promote film formation. Examples of these monomers could include n-butyl acrylate, 2-ethylhexyl-acrylate, hexylacrylate, and/or their methacrylate variation. In addition, monomers that provide film rigidity generally promote rub resistance. Examples of these monomers could include methacrylate, acrylonitrile, and styrene. Monomers that facilitate close range interactions such as hydrogen bonding and acid/base pairing can be present to control the desired print durability. Examples of these monomers could include acrylic acid, methacrylic acid, itaconic acid, fumaric acid, hydroxyethyl acrylate, hydroxyethyl methacrylate, acrylamide, methacrylamide, N-methylol(meth)acrylamide, acrylamidoacrylic acid, acrylamidoethyl(or propyl) methacrylate, 4-vinylpyridinium halide, and any monomer that contains urethane, amide, carbamate, carboxylate, carbonate, pyrimidone, urea, and isothiourea. The use of these monomers may then be balanced by ester-containing monomers in order to modulate the glass transition temperature suitable for jetting and film forming. For some embodiments, the monomer compositions are chosen to provide a glass transition temperature of the resultant polymer of 70-95° C. Specific examples of such polymer formulations may include Sty/MMA/HEA/AAm (15:65:15:5); Acry/MMA/BA/AAm (15:65:15:5); and Sty/MMA/HEA/MAA (15:65:15:5), wherein Sty=styrene, MMA=methyl methacrylate, HEA=hydroxyethyl-acrylate, Mm=acrylamide, Acry=acrylonitrile, and BA=butyl acrylate.

Figure 2:
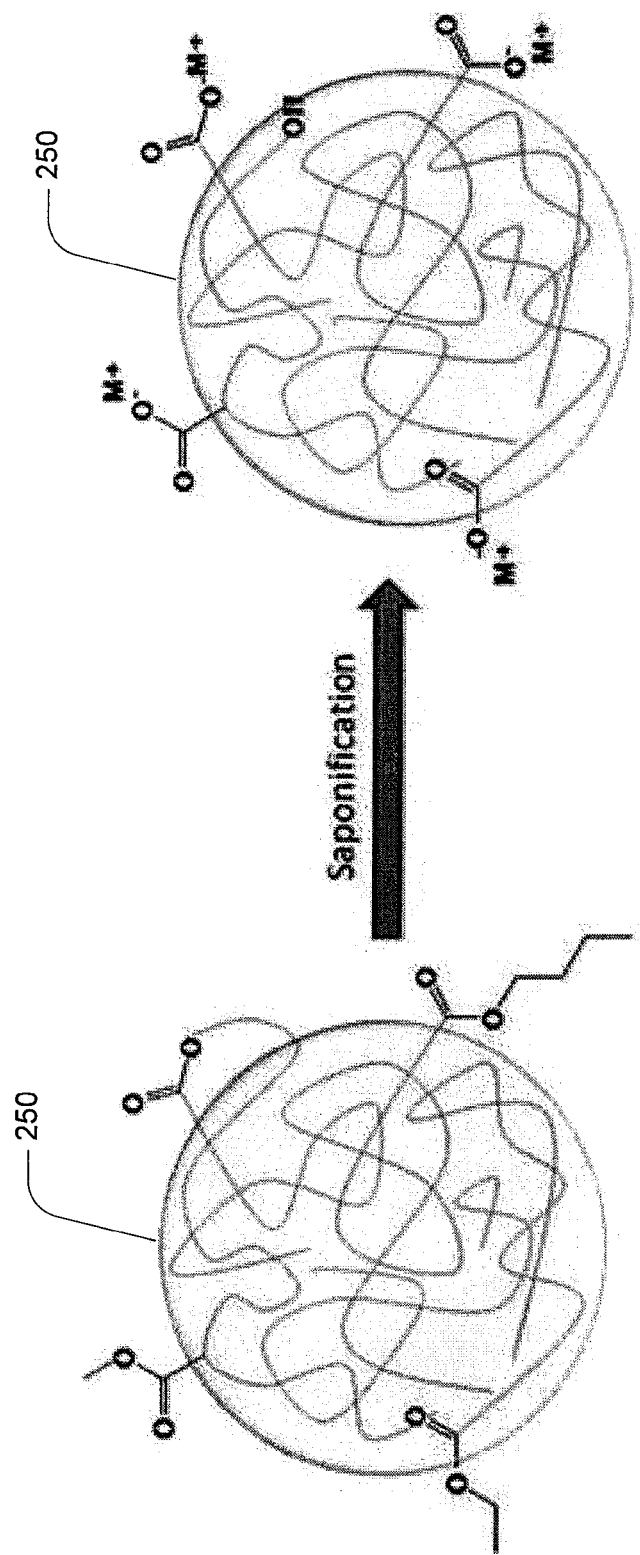
FIG. 2 is a depiction of a saponification reaction of a polymer particle in accordance with an embodiment of the disclosure.

FIG. 1 is a flowchart of a method of forming polymer particles for use in marking fluids in accordance with embodiments of the disclosure, including surface modification in accordance with embodiments of the disclosure. Polymer particles are formed at 110. The polymer particles may be formed, for example, using emulsion polymerization techniques. The polymer particles contain at least 2 wt % of acrylic esters in their formulation. For some embodiments, the acrylic ester content is 2-80 wt %. For further embodiments, the polymer particles have a glass transition temperature of 70-95° C. The polymer particles are saponified at 120, thereby converting the ester groups to salts. For one embodiment, the saponification is performed using sodium hydroxide as the base. For such an embodiment, the saponification replaces the —O-alkyl groups with —O—Na groups. FIG. 2 depicts conceptually the saponification reaction of the ester groups of a polymer particle 250 in accordance with embodiments of the disclosure. The saponified polymer particles are then incorporated into a marking fluid at 130. A marking fluid may contain, for example, an aqueous liquid vehicle, the polymer particles and one or more colorants. One or more colorants may be contained within the polymer particles. Alternatively, or in addition, one or more colorants may be included outside of the polymer particles. Furthermore, marking fluids may contain other components that do not materially affect the basic and novel properties of the compositions disclosed herein, such as surfactants, co-solvents, biocides, etc.

The following examples represent processes used to perform the surface modification of polymer particles in accordance with various embodiments of the disclosure.

EXAMPLE 1

12 mL of 1N potassium hydroxide solution and 600 mL of emulsion containing 28 wt. % of seed acrylic latex (styrene/methylmethacrylate/hexamethacrylate/acrylamide, 15:65:15:5) were allowed to mix thoroughly in a 1 L reactor, equipped with a condenser and a stirring mechanism. The pH of the solution was maintained above 10, monitored by pH meter. The reactor was then heated to an internal temperature of 80° C. for 5 hours, at which point the solution salinity had dropped to pH 8. The reaction mixture was allowed to cool to room temperature, and the final pH was adjusted by the addition of a base (i.e. KOH or NaOH), if necessary. The cooled emulsion was screened into a storage bottle for future formulation.

EXAMPLE 2

5 mL of 2M ammonium hydroxide solution and 600 mL of emulsion containing 25 wt. % of seed acrylic latex (acrylamide/methylmethacrylate/butylacrylate, 15:65:30) were allowed to mix thoroughly in a 1 L reactor, equipped with a condenser and a stirring mechanism. The pH of the solution was maintained above 10, monitored by pH meter. The reactor was then heated to an internal temperature of 80° C. for 5 hours, at which point the solution salinity had dropped to pH 8. The reaction mixture was allowed to cool to room temperature, and the final pH was adjusted by the addition of ammonium hydroxide, if necessary. The cooled emulsion was screen into a storage bottle for future formulation.

An example ink-jettable marking fluid was prepared by dispersing 6 wt % of polymer particles in accordance with an embodiment of the disclosure in a liquid vehicle. This liquid vehicle included 20 wt % organic co-solvent, 0.5 wt % surfactant, and 0.5 wt % biocide with the balance being water. The marking fluid also contained about 3% of pigment to impart color. The marking fluid was filled into inkjet pens and printed on coated paper media. The printed media was then subjected to various resistance testing, including a dry-rub test procedure and a window-cleaner test procedure.

The dry rub test was performed with a linear abraser (specifically a TABER Linear Abraser—Model 5750). The arm of the linear abraser stroked each media sample in a linear motion back and forth at a controlled stroke speed and length, the head of the linear abraser following the contours of the media samples. To the shaft of the arm of the linear abraser, a 250 gram weight was added to make the load constant. Specifically for the rub test, a stroking head or "weareaser" was attached to the end of the arm of the linear abraser. The stroking head was the size and shape of a typical pencil eraser and had a contact patch with a diameter of approximately ¼ inch diameter. The stroking head was abrasive (specifically CALIBRASE CS-10) with a mild to medium abrasive effect. The stroking head was stroked back and forth 10 times on each media sample. The rubbed media samples were judged for color fastness.

The window cleaner test was performed with a linear abraser (specifically a TABER Linear Abraser—Model 5750). The arm of the linear abraser stroked each media sample in a linear motion back and forth at a controlled stroke speed and length, the head of the linear abraser following the contours of the media samples. To the shaft of the arm of the linear abraser, a 250 gram weight was added to make the load constant. Specifically for the window cleaner test, an acrylic finger (specifically from a TABER Crock Meter Kit) covered by a cloth (specifically a TABER Crocking Cloth) was attached to the end of the arm of the linear abraser. WINDEX window cleaner was applied to the cloth and the cloth-covered end of the acrylic finger was stroked back and forth 5 times on each media sample. The rubbed media samples were judged for color fastness.

Figure 3:
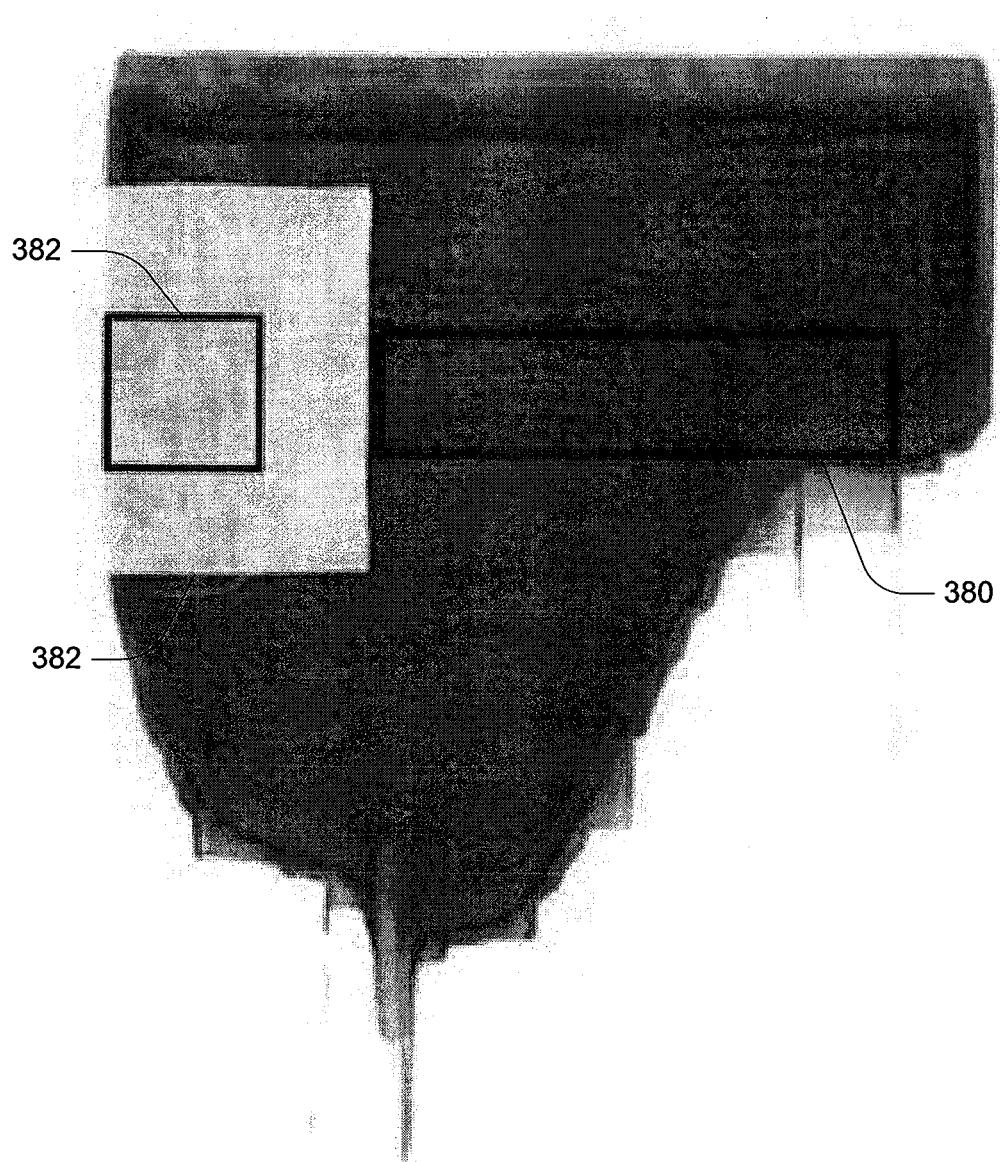
FIG. 3 is a depiction of results of testing a marking fluid containing polymer particles in accordance with embodiments of the disclosure.

FIG. 3 is a depiction of one set of results of testing a marking fluid containing polymer particles in accordance with an embodiment of the disclosure. The rectangular region 380 marks the region where both dry-rub and window-cleaner resistance tests were performed. The square 382 marks the region of the cloth 384 which was in contact with the substrate during the Windex test. As can be seen, there is no apparent rupture to the film and no noticeable transfer to the cloth.

Although specific embodiments have been illustrated and described herein it is manifestly intended that the scope of the claimed subject matter be limited only by the following claims and equivalents thereof.

What is claimed is:

1. A method of surface modification of a polymer particle for use in a marking fluid, comprising:
saponifying one or more acrylic ester groups on a surface of the polymer particle; and
incorporating the saponified polymer particle in a marking fluid;
wherein the polymer particle contains at least 2 wt % of an acrylic ester.

2. The method of claim 1, wherein saponifying one or more acrylic ester groups on a surface of the polymer particle comprises saponifying one or more acrylic ester groups on a surface of the polymer particle having a glass transition temperature of 70-95° C.

3. The method of claim 1, wherein saponifying one or more acrylic ester groups on a surface of the polymer particle comprises saponifying one or more acrylic ester groups on a surface of the polymer particle using a base selected from the group consisting of sodium hydroxide and potassium hydroxide.

4. The method of claim 3, further comprising:
adding additional base subsequent to saponifying the one or more acrylic ester groups on the surface of the polymer particle and prior to incorporating the saponified polymer particle into the marking fluid.

5. The method of claim 4, wherein adding additional base comprises adding a base different than a base used for saponification.

6. The method of claim 1, wherein saponifying one or more acrylic ester groups on a surface of the polymer particle comprises saponifying one or more acrylic ester groups on a surface of the polymer particle containing an encapsulated colorant.

7. The method of claim 1, wherein saponifying one or more acrylic ester groups on a surface of the polymer particle comprises saponifying one or more acrylic ester groups on a surface of the polymer particle while maintaining a pH of 8 or higher.

8. The method of claim 1, wherein saponifying one or more acrylic ester groups on a surface of the polymer particle comprises mixing the polymer particle in the presence of a base at a pH above 10, then reacting the one or more acrylic ester groups with the base while maintaining a pH of 8 or higher.

9. The method of claim 1, wherein saponifying one or more acrylic ester groups on a surface of the polymer particle comprises saponifying one or more acrylic ester groups on a surface of the polymer particle formulated of a monomer blend comprising a blend selected from the group consisting of styrene/methyl methacrylate/hydroxy-ethyl-acrylate/acrylamide; acrylonitrile/methyl methacrylate/butyl acrylate/acrylamide; and styrene/methyl methacrylate/hydroxy-ethyl-acrylate/methyl methacrylate.

10. The method of claim 1, wherein incorporating the saponified polymer particle in a marking fluid comprises combining the saponified polymer particle with an aqueous liquid vehicle and one or more colorants.

11. A marking fluid, comprising:
an aqueous liquid vehicle;
polymer particles; and
one or more colorants;
wherein the polymer particles are formed of a formulation containing at least 2 wt % of an acrylic ester; and
wherein ester groups on surfaces of the polymer particles have been saponified.

12. The marking fluid of claim 11, further comprising:
one or more other components selected from the group consisting of surfactants, co-solvents and biocides.

13. The marking fluid of claim 11, wherein at least one colorant is a pigment.

14. The marking fluid of claim 11, wherein at least one colorant is encapsulated in one or more of the polymer particles.

15. The marking fluid of claim 11, wherein the polymer particles are formulated of a monomer blend comprising a blend selected from the group consisting of styrene/methyl methacrylate/hydroxy-ethyl-acrylate/acrylamide; acrylonitrile/methyl methacrylate/butyl acrylate/acrylamide; and styrene/methyl methacrylate/hydroxy-ethyl-acrylate/methyl methacrylate.

* * * * *